United States Patent [19]

Terao et al.

[11] 4,348,461
[45] Sep. 7, 1982

[54] RECORDING MEMBER

[75] Inventors: Motoyasu Terao, Hinodemachi; Yoshio Taniguchi, Hino; Shinkichi Horigome, Tachikawa; Masahiro Ojima, Kokubunji; Kazuo Shigematsu, Kawasaki; Keizo Kato, Hachioji; Yoshinori Miyamura, Hinodemachi; Seiji Yonezawa, Hachioji, all of Japan

[73] Assignee: Hitachi, Ltd., Tokyo, Japan

[21] Appl. No.: 160,661

[22] Filed: Jun. 18, 1980

[30] Foreign Application Priority Data

Jun. 22, 1979 [JP] Japan .................................. 54-78203

[51] Int. Cl.³ .............................................. B32B 5/14
[52] U.S. Cl. ................................ 428/409; 346/76 L; 346/135.1; 346/137; 427/53.1; 427/166; 427/255; 427/264; 428/426; 428/688; 428/913
[58] Field of Search ............... 428/64, 538, 409, 913, 428/426, 688; 358/128.5; 346/76 L, 135.1, 137; 427/53.1, 166, 255, 264

[56] References Cited

U.S. PATENT DOCUMENTS

| | | | |
|---|---|---|---|
| 2,822,300 | 2/1958 | Mayer et al. | 428/538 |
| 3,901,996 | 8/1975 | Hasegawa et al. | 428/426 |
| 3,971,874 | 7/1976 | Ohta et al. | 428/913 |
| 4,032,691 | 6/1977 | Kido et al. | 428/913 |
| 4,069,487 | 1/1978 | Kasai et al. | 428/913 |
| 4,214,249 | 7/1980 | Kasai et al. | 428/913 |
| 4,238,803 | 12/1980 | Terao et al. | 346/135.1 |

FOREIGN PATENT DOCUMENTS 52-64905 5/1977 Japan.

Primary Examiner—John J. Gallagher
Attorney, Agent, or Firm—Craig and Antonelli

[57] ABSTRACT

A recording member having a predetermined substrate, and a thin film which is formed on the substrate and which is formed with recesses or pits for recording information when irradiated with a working beam, characterized in that said thin film is formed of an inorganic material which contains at least arsenic, selenium and tellurium, and that a distribution of either of said Se and said Te decreases from a part near the surface of said thin film towards a central part thereof, while a distribution of said As increases from a part near the surface towards said central part, is disclosed. This recording member can afford a high signal-to-noise ratio and a long lifetime. It is preferable that the distribution of said Se decreases so as to be at least 50 atomic-% in terms of the content of said Se in a part being the closest to the surface of said thin film and to be at most 40 atomic-% in terms of the average content of said Se over the whole thin film, and that the distribution of said As increases so as to be at most 15 atomic-% in terms of the content of said As in the closest part and to be 5 to 35 atomic-% in terms of the average content of said As in said whole thin film. The Se-Te-As-based material may well be doped with at least one element selected from the group consisting of Ge, S, Tl, Sn, Pb, In and Ta, within a range of 2 to 15 atomic-%.

7 Claims, 14 Drawing Figures

RECORDING MEMBER

BACKGROUND OF THE INVENTION

1. Field of the Invention

This invention relates to a member for recording information. More particularly, it provides a member in which a thin film disposed on a predetermined substrate is irradiated with an energy beam such as laser beam, to form recesses in the irradiated parts and which is suited to perform the recording of information.

2. Description of the Prior Art

Heretofore, there have been promoted the developments of recording members which can attain high signal-to-noise ratios (S/N ratios) even when picture information etc. at very high densities are recorded for use in optical video disks. For example, a thin film of bismuth (Bi) and thin films of some chalcogenides have been known as the thin films of the recording members to overlie disk substrates. They are disclosed in Japanese patent application publications Nos. 40479/1971 and 20136/1979, Japanese Patent Application Public-disclosures Nos. 42849/1975, 51738/1975, 154602/1977 and 31105/1978, etc. These films, however, have been unsuitable as the recording members because of the irregular shapes of pits, and have been problematic in point of lifetime. As As-Te-based thin film which has been recently developed exhibits a high recording sensitivity and affords a high signal-to-noise ratio in case of recording information by forming pits by irradiation with an energy beam such as laser beam. An example of this film is seen in Japanese patent application publication No. 15483/1979. Both As and Te, however, oxidize when let stand in the air for a long term. Therefore, the recording medium still involves an unstability in a long-term use and has not been yet earnestly put into practical use.

Further, there have been proposals for eliminating such problems, but they cannot be said to be satisfactory. An example of the proposals is to reduce the concentration of As in the recording thin film, and is disclosed in Japanese Patent Application Public-disclosure No. 31106/1978.

SUMMARY OF THE INVENTION

This invention has for its object to eliminate the disadvantages mentioned above and to provide a recording member which has a good S/N ratio and exhibits stable characteristics over a long term.

One aspect of performance of this invention for accomplishing the object is characterized in that a thin film layer for recording is made of a chalcogenide which is composed of at least the three elements of arsenic (As), tellurium (Te) and selenium (Se), and that the composition ratio of either Se or Te of the thin film layer decreases not abruptly i.e. gradually towards the central part of the recording layer in the vicinity of the surface thereof (that is, on the side thereof remote from a substrate), while As presents a distribution in which it increases not abruptly i.e. gradually towards the central part of the recording layer.

Preferably the average content of As of the recording thin film is 5–35 atomic-%, and more preferably it is 10–25 atomic-%. Preferably the average content of Se is 40 atomic-% or less, and more preferably it is 5–25 atomic-%. The balance is made Te.

Especially in a region within 50 Å from the surface of the recording film (here in this specification, the region shall be termed the "surface layer"), the concentration of As is made preferably 15 atomic-% or less, particularly 2–10 atomic-%. The Se content is made preferably 50 atomic-% or more. These are effective for rendering the lifetime long while holding good "write" characteristics of the Se-As-Te-based material.

Regarding the distribution of the As atoms in the direction of the thickness of the film, it is favorable to vary the As concentration at a gradient of $1/100-\frac{1}{2}$ atomic-%/Å. As the gradient, a range of 1/25–1/5 atomic-%/Å is especially favorable. Of course, the As concentration need not have an identical concentration gradient over the full thickness of the film. The gradient of the As concentration had better change comparatively abruptly in the vicinity of the surface of the recording film.

Even when the Se-Te-As-based materials thus far described are doped with at least one element selected from the group consisting of Ge, S, Tl, Sn, Pb, In and Ta, characteristics substantially equivalent to those of the Se-Te-As-based materials can be attained. The quantity of doping of such dopant elements is made 2–15 atomic-%.

Since the recording film of this invention is constructed as described above, the oxidation of arsenic can be readily prevented even when the surface layer is activated into a state easy of oxidation in such a manner that light impinges on the thin film to sever the chemical bonds of the elements of As, Te and Se and to permit As to freely move about in the surface layer of the film. This is because, in the surface layer, Te which does not easily react with oxygen and Se which hardly reacts therewith exist in quantities larger than that of As. Since the oxidation of arsenic can be prevented in this way, $As_2O_3$ crystals which otherwise adhere and grow near recorded recesses or pits and form a cause for erroneous signals of information do not appear at all, and a good information recording is provided. Further, the recording member of this invention can also avoid oxidation of Te and does not under any collapse of the distributions of its constituents with the lapse of time. Also, the recording member is stable and is also effective in preventing the occurrence of harmful crystals within the thin film because Se, Te and As are present distributions that vary gradually. Since the distribution states can be stably held, the recording characteristics of information are stable, and a recording under substantially the same conditions as those at the initial stage is possible even after several years.

DETAILED DESCRIPTION OF THE INVENTION

Hereunder, this invention will be described in detail in connection with its embodiments.

Figure 1:
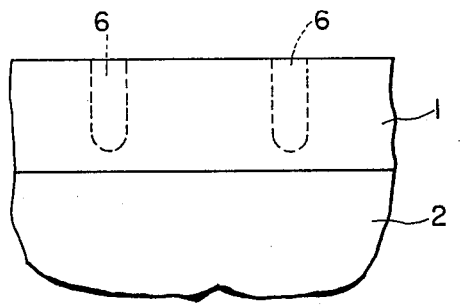
FIGS. 1 and 4 are schematic sectional views each showing a recording member of this invention.
Figure 2:
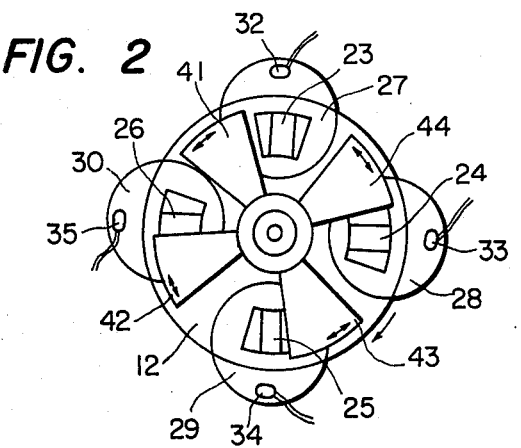
FIG. 2 is a plan view of an evaporation apparatus for a recording thin film.

FIG. 1 is a schematic sectional view of a recording member which is an embodiment of this invention. A thin film for recording 1 is formed on a glass substrate 2 for an optical disk. A predetermined information is recorded in such a way that a recess or pit 6 is formed in the thin film by a laser beam (alternatively, an electron beam) which is generated in correspondence with a predetermined electric signal. In this specification, a recess indicate, either a hole penetrating the thin film or a cavity not penetrating the thin film. In general, in the uses of the video disk etc., the recess or pit has a shorter diameter of approximately 0.5–1.2 $\mu$m. The thin film 1 is made of a mixture or compound composed of As, Te and Se, and is readily formed by the known vacuum evaporation process. In an example, As, Te and Se materials each having a purity of at last 99.99% were prepared, and the As and Te materials mixed in a mixture $As_{30}Te_{70}$ were put in quartz ampoules. After the quartz ampoules were evacuated to a degree of vacuum of $5 \times 10^{-6}$ Torr, they were sealed off. Subsequently, these quartz ampoules were heated at 800° C. in an electric oven for 3 hours or longer and were shaken during the heating. Cooling was performed by taking out the ampoules from the electric oven. Subsequently, the materials were taken out of the quartz ampoules and crushed roughly. A schematic plan view of an apparatus used for forming the recording thin film is shown in FIG. 2.

A glass disk of a diameter of 35 cm whose both surfaces were optically polished and cleansed was arranged in the vacuum evaporation apparatus in a manner to be rotatable about a central shaft. Three boats for evaporation 23, 24 and 25 were arranged so as to underlie the region of the disk intended to record information and to be located substantially on one circle concentric with the central shaft. A boat 26 was for adding another element. Two of the three boats contained the $As_{30}Te_{70}$ materials, and the other boat contained the Se material. The respective boats were made of tantalum, and in order to prevent liquid drops or small lumps of the evaporation materials from scattering and adhering to the substrate, all the boats had a structure in which the evaporation materials were not directly seen from the place of the evaporation substrate to have an evaporated film deposited thereon. Sectoral slits (27, 28, 29 and 30) and shutters (41, 42, 43 and 44) were arranged between the respective boats and the glass disk. They were so constructed that when the shutter moved, it closed any desired proportion of the slit. After exhausting the apparatus into a vacuum, current was caused to flow through the boat to vaporize the material in the boat while rotating the glass disk at 120 rpm. The quantity of vaporization from the boat was detected by a crystal oscillator type film thickness monitor 32, 33, 34 or 35, and the current to flow through the boat was controlled so that the evaporation rate might become constant. In case where the materials were simultaneously evaporated from two or more boats, the ratio of the rates of the evaporations from the respective boats onto the disk was decided by the opening angles of the corresponding shutters. First of all, the disk substrate had a recording layer evaporated thereon from the first boat containing the predetermined $As_{30}Te_{70}$ material. The quantity of the $As_{30}Te_{70}$ material contained in the boat was such that when the whole quantity was evaporated on the disk, a film of about 800 Å was formed. The distance between the boat and the evaporation surface of the disk was about 70 mm. When the quantity of evaporation from the boat reached 1/5 of the quantity of the material contained in the boat at the beginning, the shutter was opened, and the evaporation was carried out at an average evaporation rate of 2 Å/sec. When note is taken of a part of the surface of the disk, the part is subjected to the evaporation only when it passes over the boat. Accordingly, the instantaneous evaporation rate is higher than 2 Å/sec and is approximately 30 Å/sec. When the rate of the evaporation from the boat is made much higher than the rate at which the average evaporation rate becomes 2 Å/sec, the liquid drops or small lumps of the evaporation material are liable to scatter from the boat and adhere to the disk. On the other hand, when the evaporation rate is made much lower than the rate which renders the average evaporation rate 2 Å/sec, the flatness of the evaporated film degrades.

In this invention, the respective elements vary in the depth direction of the thin film and present gradients within the thin film. Therefore, although the evaporation method above stated is fundamental, a further contrivance is necessary. More specifically, the starting evaporation material in the other boat (second boat) containing the $As_{30}Te_{70}$ material was firstly vaporized about ½ (by weight) with the shutter held closed. When the material from the first boat could be evaporated to a film thickness of approximately 200 Å, the shutter of the first boat was gradually closed, and the shutter of the second boat was gradually opened. Further, when the film thickness reached approximately 300 Å, also the shutter of the third boat containing the Se material began to be opened and was opened gradually and slowly. The shutters were so controlled that when the film thickness reached approximately 400 Å, the shutters of the second and third boats became fully open whereas the shutter of the first boat became fully closed. Then, the evaporations were completed. The vaporized matter from the second boat contained only about 12 atomic-% (atomic percent) of As.

To make the surface mostly contain Se in this manner is effective to prevent $As_2O_3$ crystals from appearing. Further, by adopting the above construction under the condition under which the proportion of As relative to Te is made small in the vicinity of the surface, the proportion of appearance of the $As_2O_3$ crystals after the recording with a laser beam can be reduced still more.

It is considered to increase only the quantity of Te in the vicinity of the surface. With this measure, however, when the recording member is preserved for long, an oxide film of Te is formed and hinders an additional recording. Also for this reason, it is better that Se is contained in the film. However, Se is comparatively weak against heat, and hence, when it exists alone, a part containing Se in large quantities is formed over a deep range from the surface of the film. This is prone to incur the crystallization of the film, and must be avoided.

Figure 3:
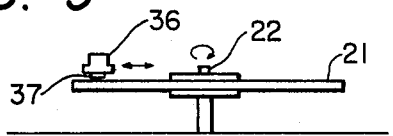
FIG. 3 is an explanatory view of an apparatus for writing information.

The recording of information in the film formed as above described was carried out as illustrated in FIG. 3. While rotating the glass disk 21 at a high speed (1,800 r.p.m.), a recording head 36 having a semiconductor laser was brought near to the disk at a fixed spacing, and a laser beam 37 having a wavelength of 8,300 Å and affording a spot diameter of 1.5 μm was condensed and projected by a lens included in the recording head. The laser beam was in the shape of pulses, the lengths and intervals of which were modulated in conformity with the information to be recorded. Those parts of the evaporated film of the recording member which were irradiated with the laser beam were formed with elliptical pits of shorter diameters about 1.0 μm by the vaporization of the materials and/or the movement thereof to the peripheries, whereby the recording was executed. To the end of reducing noise and reading out an accurate picture, it is an especially required condition that the contours of the pits are smooth. The recordng head was moved along a line parallel to a radial direction of the disk in accordance with the rotation of the disk.

The read-out of the recording was carried out as follows. The disk was rotated at 1,800 r.p.m., and a reading head was held close to the disk at a fixed spacing. A semiconductor laser beam was condensed and projected by a lens, and the intensity changes of reflected light were detected by a detector.

The signal-to-noise ratio was measured as follows. While rotating the disk at 1,800 r.p.m., pulse-shaped carrier signals having a pulse recurrence frequency of 6 MHz and a pulse width of 65 ns were recorded in advance by a semiconductor laser beam (wavelength: 8,300 Å) having a power of about 15 mW. The recorded signals were read out by utilizing the intensity changes of a reflected beam by the use of the same semiconductor laser beam. The measured CN (carrier to noise) ratio was converted into SN ratio for color video signal.

In the present embodiment, a signal-to-noise ratio of about 40 dB was obtained.

The use of the recording member of this invention makes it possible to record a picture whose quality is more excellent that even those of pictures recorded in known magnetic disks and magnetic tapes.

The preferable range of thicknesses of the recording film was 200–1,000 Å.

Figure 14:
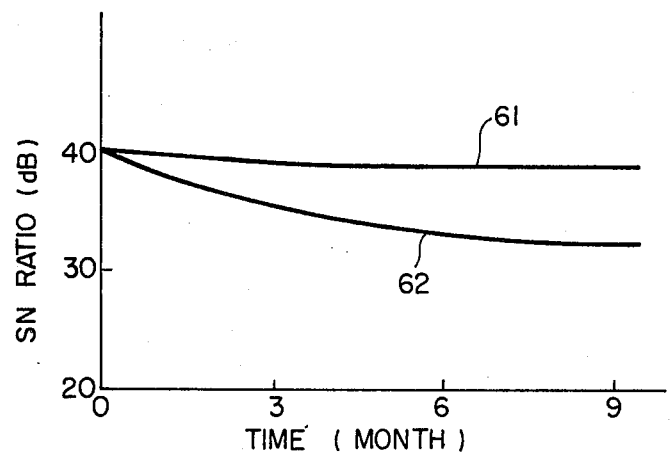
FIG. 14 is a graph showing the comparison between the characteristics of a recording film of this invention and a recording film which does not have a construction as in this invention.

FIG. 14 is a characteristic diagram showing the changes-versus-time of the recording member of this invention. Curve 61 indicates the variation of the S/N ratio in the case where the recording and readout were executed by the use of the recording member thus far described. Curve 62 indicates the variation of the S/N ratio in the case of using a recording film in which two layers of As-containing chalcogenides were stacked. In the stacked recording film, the layer on the surface side was made of As (5 atomic-%)-Se (70 atomic-%)-Te (25 atomic-%), while the layer on the substrate side was made of As (20 atomic-%)-Se (40 atomic-%)-Te (40 atomic-%). The recording layers were preserved in an atmosphere of 60° C. It is understood from FIG. 14 that the recording film of this invention is more excellent. It is not effective for prolonging the lifetime that merely the As concentration of the surface layer is low, but it is important that the As concentration dose not change abruptly.

Figure 4:
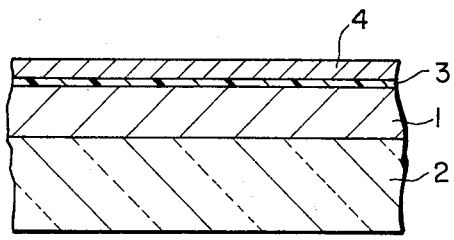

As the substrate, the glass substrate can be replaced with a PMMA (polymethyl methacrylate resin) substrate having a thickness of about 1 mm. The recording and readout can be made by projecting light from the substrate side. Further, it is possible to protect the recording film 1 in such a way that, as illustrated in FIG. 4, the As-Te-Se film 1 is coated with an organic substance 3 having a bonding effect such as PMMA, polyvinyl alcohol and cellulose acetate, whereupon a plate 4 made of an organic resin, glass, metal or the like is stuck. Shown at 2 is the disk substrate. Preferably, the thickness of the As-Te-Se-based evaporated film in this case ranges from 50 to 500 Å.

Figure 5:
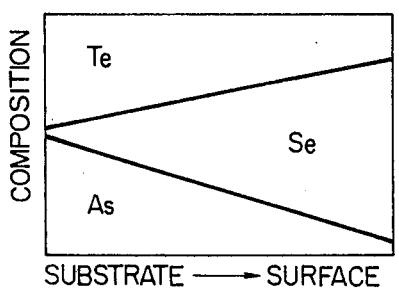
FIGS. 5 to 13 are diagrams each showing an example of a composition profile of a recording film of this invention in the direction of the thickness of the film.

FIGS. 5 to 13 illustrate as models various composition profiles within recording thin films of this invention. Needless to say, this invention is not restricted to them. FIG. 5 depicts the commonest case, in which As increases linearly towards the substrate, Se decreases linearly and Te increases linearly. This distribution state is the most favorable as stated in the foregoing embodiment. It goes without saying that Se and Te may be reversed for some purposes. Although Te will not be especially referred to hereinbelow, compositions in which it is reversed with Se are also usable. However, the distribution in which Se is contained more on the surface side of the recording film is more preferable as stated before.

Table 1 lists examples in the case where As was variously distributed in the composition profile of FIG. 5. All the examples achieved effects of rendering the lifetime long.

TABLE 1

| Sample No. | Thickness of film (Å) | As content Surface layer (at. %) | As content Gradient (at. %/Å) | As content Average content (at. %) | Se content Surface layer (at. %) | Se content Gradient (at. %/Å) | Se content Average content (at. %) | Te content |
|---|---|---|---|---|---|---|---|---|
| 1 | 1,000 | 5 | $\frac{1}{25}$ | 25.0 | 50 | $-\frac{1}{25}$ | 30 | balance |
| 2 | 500 | 5 | $\frac{1}{50}$ | 10.0 | 50 | $-\frac{1}{12.5}$ | 30 | |
| 3 | 1,000 | 15 | $\frac{1}{100}$ | 20.0 | 50 | $-\frac{1}{25}$ | 30 | |
| 4 | 500 | 5 | $\frac{1}{15}$ | 21.5 | 50 | $-\frac{1}{12.5}$ | 30 | |

Figure 9:
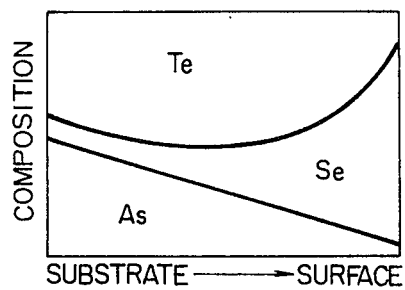
Figure 6:
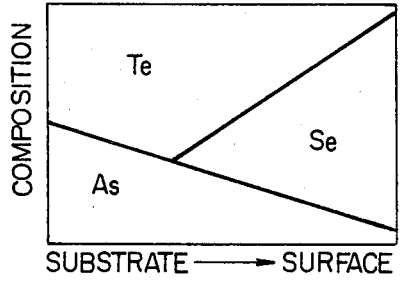
Figure 10:
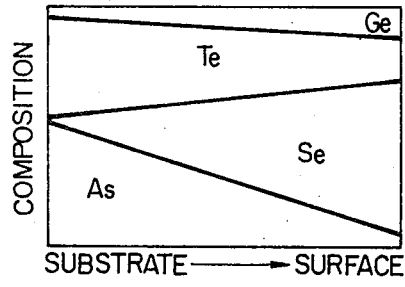
Figure 7:
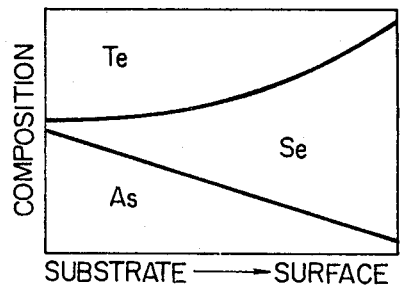
Figure 11:
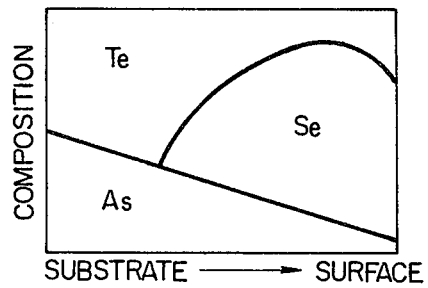
Figure 8:
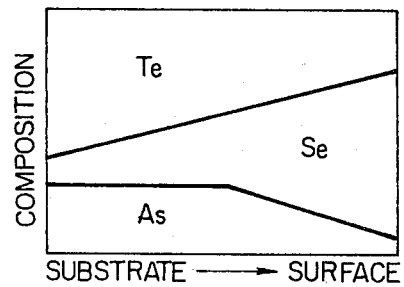
Figure 12:
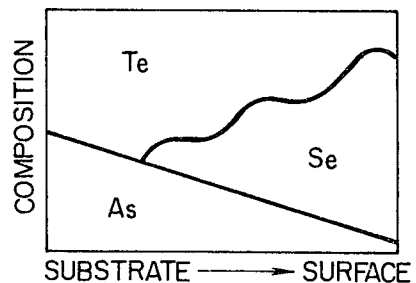
Figure 13:
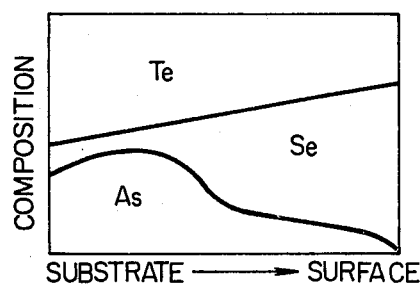

FIG. 6 shows an example in which, in the composition profile of FIG. 5, the distribution of Se extends to the vicinity of the central part of the recording film. FIG. 7 shows an example in which Se is expressed by a smoothly curved distribution. FIG. 8 shows an example in which the distribution of As reaches a fixed value in the vicinity of the central part, the fixed value being held down to the substrate. FIG. 9 depicts an example in which the distribution of Se presents a minimum value near the central part. FIG. 10 shows an example which is doped with Ge as another element. At least one element other than Ge as selected from among S, Tl, Sn, Pb, In and Ta may be employed as well. It is needless to say that the average content of the dopant or dopants ought to be 2–15 atomic-%. Also needless to say, such fourth element or elements can be added to the other types of composition profiles. FIG. 11 illustrates that, if the distribution of Se has maximum near the surface, this invention is applicable. FIG. 12 shows a case where the distribution of Se decreases towards the vicinity of the central part with a smooth curve. FIG. 13 shows an example in which the variation of the distribution of As in the direction of the thickness of the film is not uniform. In this manner, the distribution of As in the thickness direction need not always vary uniformly.

What is claimed is:

1. A recording member having a predetermined substrate, and a thin film which is formed on the substrate and which is formed with recesses for recording information when irradiated with a working beam; said thin film being formed of an inorganic material containing at least arsenic, selenium and tellurium, with the concentration of the selenium decreasing from a part of the film near the surface of said thin film towards a central part thereof and the concentration of the arsenic increasing from a part of the film near the surface towards the central part of said film; the concentration of selenium being at lest 50 atomic-% in a part of said thin film that is the closest to said surface thereof with the average concentration of selenium being at most 40 atomic-% over the whole thin film, and the concentration of arsenic being at most 15 atomic-% in a part of said thin film that is the closest to said surface thereof with the average concentration of arsenic being 5 to 35 atomic-% over the whole thin film.

2. A recording member as defined in claim 1, wherein said thin film is doped with at least one element selected from the group consisting of germanium, sulfur, thallium, tin, lead, indium and tantalum, in a range of 2 to 15 atomic-% in terms of a total quantity thereof.

3. A recording member as defined in claim 1, wherein said surface of said thin film is covered with a protective coating.

4. A recording member as defined in claim 1, wherein the average content of arsenic in said film is from 10 to 25 atomic-% and the average concentration of selenium is from 5 to 25 atomic-%.

5. A recording member as defined in claim 4, wherein the concentration of arsenic in the part of said thin film that is closest to said surface is from 2 to 10 atomic-%.

6. A recording member as defined in claim 1, wherein said thin film has a thickness from 200-1,000 Å.

7. A recording member as defined in claim 1, wherein the concentration of arsenic varies with a gradient of 1/100 to $\frac{1}{3}$ atomic-%/Å in said thin film.

* * * * *